United States Patent
Middleton

(10) Patent No.: US 7,364,652 B2
(45) Date of Patent: Apr. 29, 2008

(54) SCREENING APPARATUS

(75) Inventor: David Grant Middleton, Rotherham (GB)

(73) Assignee: Three Star Environmental Ltd., Rotherham (GB)

( * ) Notice: Subject to any disclaimer, the term of this patent is extended or adjusted under 35 U.S.C. 154(b) by 159 days.

(21) Appl. No.: 10/790,691

(22) Filed: Mar. 3, 2004

(65) Prior Publication Data

US 2004/0262242 A1    Dec. 30, 2004

(30) Foreign Application Priority Data

Mar. 6, 2003   (GB) ................. 0305088.7

(51) Int. Cl.
E03F 5/14    (2006.01)
(52) U.S. Cl. ............. 210/158; 210/160; 210/170.03; 210/391; 210/400; 210/783
(58) Field of Classification Search .......... 210/158, 210/159, 780, 791
See application file for complete search history.

(56) References Cited

U.S. PATENT DOCUMENTS

| | | | |
|---|---|---|---|
| 1,748,151 A * | 2/1930 | Stehling | |
| 2,204,534 A * | 6/1940 | Fraser | 210/270 |
| 2,228,852 A * | 1/1941 | Shafer, Jr. | |
| 2,267,086 A * | 12/1941 | Donohue | 210/779 |
| 3,259,244 A * | 7/1966 | Kaljo et al. | 209/240 |
| 3,706,378 A | 12/1972 | Markwick | |
| 4,242,205 A | 12/1980 | Hirs | |
| 4,390,428 A * | 6/1983 | Bratten | 210/400 |
| 4,421,647 A * | 12/1983 | Estabrook et al. | 210/387 |
| 4,424,129 A * | 1/1984 | Bunger | 210/388 |
| 4,731,180 A | 3/1988 | Huff | |
| 4,865,724 A * | 9/1989 | Brandt et al. | 210/104 |
| 4,895,647 A * | 1/1990 | Uchiyama | 210/171 |
| 4,935,131 A * | 6/1990 | Pindar | 210/160 |
| 4,992,167 A * | 2/1991 | Uchiyama | 210/171 |
| 5,102,536 A * | 4/1992 | Wiesemann | 210/158 |
| 5,167,839 A * | 12/1992 | Widmer et al. | 210/784 |
| 5,378,375 A * | 1/1995 | Bache | 210/772 |
| 5,531,888 A * | 7/1996 | Geiger et al. | 210/162 |
| 5,603,846 A * | 2/1997 | Uchiyama et al. | 210/784 |
| 5,738,782 A * | 4/1998 | Schafer et al. | 210/171 |
| 5,814,216 A * | 9/1998 | Filion | 210/154 |
| 5,992,642 A * | 11/1999 | Ota | 210/396 |
| 6,042,726 A * | 3/2000 | Anderson | 210/297 |
| 6,294,085 B1 * | 9/2001 | Bache | 210/155 |

(Continued)

FOREIGN PATENT DOCUMENTS

DE    41 01 456 A1    7/1992

(Continued)

Primary Examiner—Robert James Popovics
(74) Attorney, Agent, or Firm—Jacobus C. Rasser; David P. Owen

(57) ABSTRACT

Screening apparatus (101,901) for use at an overflow weir (301, 902) in a sewerage system. The apparatus comprises a continuous moving screen band (201, 902) and a band cleaning mechanism (608). A first portion (801) of the screen band is configured to move along the weir towards one of its ends, and a second portion (803) of the screen band is configured to move along the weir towards its opposite end. A steeper portion (805) of the screen band extends to an elevated position (806) above the first and second portions, and the band cleaning mechanism is arranged to remove solid matter from the screen at said elevated position.

3 Claims, 10 Drawing Sheets

U.S. PATENT DOCUMENTS

| | | | |
|---|---|---|---|
| 6,338,795 B1 * | 1/2002 | Okajima et al. | 210/167.04 |
| 6,365,045 B1 * | 4/2002 | Bache | 210/256 |
| 6,500,339 B2 * | 12/2002 | Ogasawara | 210/295 |
| 6,571,959 B1 * | 6/2003 | Moore et al. | 210/394 |
| 6,679,994 B1 * | 1/2004 | Turco et al. | 210/767 |
| 6,953,524 B2 * | 10/2005 | Woodbridge et al. | 210/97 |
| 7,048,850 B2 * | 5/2006 | DePaso et al. | 210/155 |
| 2004/0262242 A1 * | 12/2004 | Middleton | 210/783 |

FOREIGN PATENT DOCUMENTS

| | | |
|---|---|---|
| EP | 0 636 751 B1 | 2/1995 |
| EP | 0728 512 A2 | 8/1996 |
| GB | 1 221 971 | 2/1971 |
| GB | 1 330 909 | 9/1973 |
| GB | 2 354 186 A | 3/2001 |
| GB | 2 356 157 A | 5/2001 |
| WO | WO 99/49145 | 9/1999 |
| WO | WO 00/62896 | 10/2000 |
| WO | WO 01/30481 | 5/2001 |

* cited by examiner

SCREENING APPARATUS

BACKGROUND OF THE INVENTION

1. Field of the Invention

The present invention relates to screening apparatus for use at an overflow weir in a sewerage system and a method of manufacturing screening apparatus. More specifically, the screening apparatus is configured for use with a side weir of a sewerage channel.

2. Description of the Related Art

Sewerage channels carry a mixture of liquids and solids to treatment plants. During wet weather, some channels receive rain water and consequently their flow levels are raised. To manage increased flow rates, such channels are provided with overflow weirs which allow excess water to leave the sewerage system and enter a watercourse such as a river.

In order to prevent undesirable solids from leaving the sewerage channel by the overflow weir and entering a watercourse, it is known to provide a screen along the weir. Such a screen allows a flow of water over the weir but screens out solid matter which is maintained in the flow in the sewerage channel.

A screen in this situation can become blinded, i.e. blocked, by the solid matter in the mixture. Consequently, it is known to provide screens in the form of a horizontal continuous moving band which move past a cleaning device to prevent blinding. During high flow level conditions, the lower surfaces of the screen provide the filtering function while the upper surface is intended to operate above the water level such that it may be cleaned by the brush.

Such screens are limited in their effectiveness to allow water to flow freely over the weir. In addition, during extreme conditions, the brush may become submerged which leads to ineffective cleaning and the screen becoming rapidly blinded. Consequently, the screen becomes completely ineffective until the extreme conditions have subsided.

U.S. Pat. No. 4,242,205 to Hirs discloses a continuous belt filter having a horizontal portion and a portion at an upward angle to the horizontal. The top of the angled portion is positioned such that in normal use it is not submerged in the liquid to be filtered. The non-submerged portion is provided with a water or air jet for cleaning. This design is not believed to be suitable for use in a sewerage system.

Accordingly, it is an object of the present invention to provide a screen apparatus for use at an overflow weir in a sewerage system that can be cleaned effectively even when water is flowing over the weir.

BRIEF SUMMARY OF THE INVENTION

According to a first aspect of the present invention, there is provided screening apparatus for use at an overflow weir in a sewerage system, comprising a continuous moving screen band and a band cleaning mechanism comprising a cleaning device made of a solid but flexible material, wherein a first portion of said screen band is configured to move along said weir towards one end of said weir, a second portion of said screen band is configured to move along said weir towards the opposite end of said weir, a steeper portion of said screen band extends to an elevated position above said first and second portions, and said band cleaning mechanism is arranged to remove solid matter from the screen at said elevated position. It is preferred that the elevated position does not become submerged, even when water is flowing over the weir.

According to a second aspect of the present invention, there is provided a method of screening sewage at an overflow weir in a sewerage system, comprising the steps of: moving a continuous screen band around a guide means such that a first portion of said screen band moves along said weir towards one end of said weir, a second portion of said screen band moves along said weir towards the opposite end of said weir, and a steeper portion of said screen band extends to an elevated position above said first and second portions; and cleaning solid matter from the screen at said elevated position by means of a band cleaning mechanism comprising a cleaning device made of a solid but flexible material. It is preferred that the elevated position is located such that it does not become submerged even when water is flowing over the weir.

In a preferred embodiment the cleaning mechanism comprises a rotating cleaning device. An example of such a device is a rotating cylinder, longitudinally provided with strips of a flexible material, for example polyethylene. The strips nearest to the band engage the band in a touching relationship. When the cylinder is rotated, the flexible strips clean the band in a combination of scraping and flicking actions. As the cleaning device is in contact with a portion of the band that does not become submerged, the cleaning action of the flexible strips is not impeded by being immersed in water.

In a particularly preferred embodiment the cleaning mechanism comprises a rotating brush. It is believed that the flicking action is an important part of the cleaning action of brushes. Since the bristles do not become submerged this flicking action is not impeded, allowing the brushes to keep their cleaning efficiency even when water flows over the weir.

The material of the bristles is selected to provide a good combination of strength, durability, and flexibility. Suitable bristle materials include nylon, polypropylene, and polyethylene. Other materials may be selected, as will be apparent to those skilled in the art.

WRITTEN DESCRIPTION OF THE BEST MODE FOR CARRYING OUT THE INVENTION

FIG. 1

Figure 1:
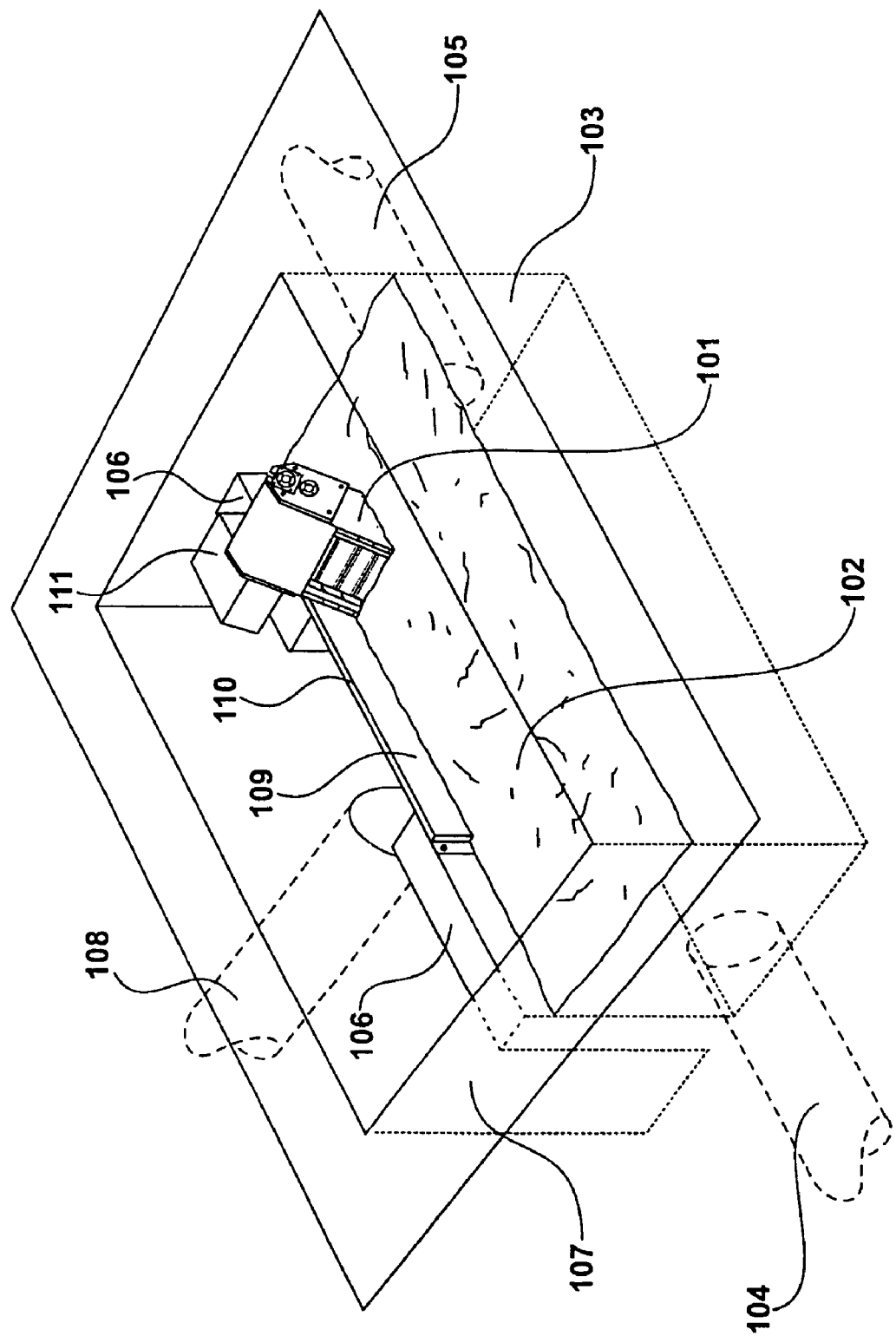
FIG. 1 shows a screening apparatus 101, partly submerged in sewage 102.

A screening apparatus 101 is shown partly submerged in sewage 102 in a continuation chamber 103 in FIG. 1. The level of sewage 102 illustrated in FIG. 1 is a typically high level that is reached when the sewerage system has received large amounts of rain water.

The sewage 102 is a liquid and solid mixture which flows into the chamber 103 from a sewer pipe 104. At least a portion of the sewage 102 exits the chamber 103 via sewer pipe 105 and may continue flowing to other parts of the sewerage system leading to a sewage treatment plant.

During periods when flow rates are low, all sewage entering via pipe 104 will subsequently exit via sewer pipe 105.

A concrete wall 106 of the chamber 103 separates said chamber from an overflow chamber 107. A section of the wall 106 is of a lower height than the sections either side of it, and the lower section defines a weir. During periods when flow rates along the sewer are high, the level in the chamber 103 becomes correspondingly high. (As illustrated in FIG. 1.) To assist the lowering of the high water levels, excess water is allowed to flow from chamber 103, over the weir and into overflow chamber 107. The excess water then flows from chamber 107 to a watercourse, such as a river, or a storm tank, via pipe 108.

A blanking plate 109, which forms a part of the screening apparatus 101 is rigidly attached to the concrete wall 106. The blanking plate 109 closes off the gap between the two higher portions of the wall 106, such that in order to pass over the weir, water from the sewage 102 must first pass through submerged screening panels of the apparatus 101.

It may be noted that the upper edge 110 of the blanking panel 109 is at the same height as the top of the wall 106. In extreme conditions when the sewage level in chamber 103 continues to rise above that illustrated in FIG. 1, and reaches the upper edge 110 it will then spill over said edge into the overflow chamber. Therefore, the upper edge 110 defines an emergency overflow level. It may also be noted that a motor housing 111 which provides a housing for drive machinery of the apparatus 101 is located above the emergency overflow level, and therefore remains above water even during extremely high flow levels.

FIG. 2

Figure 2:
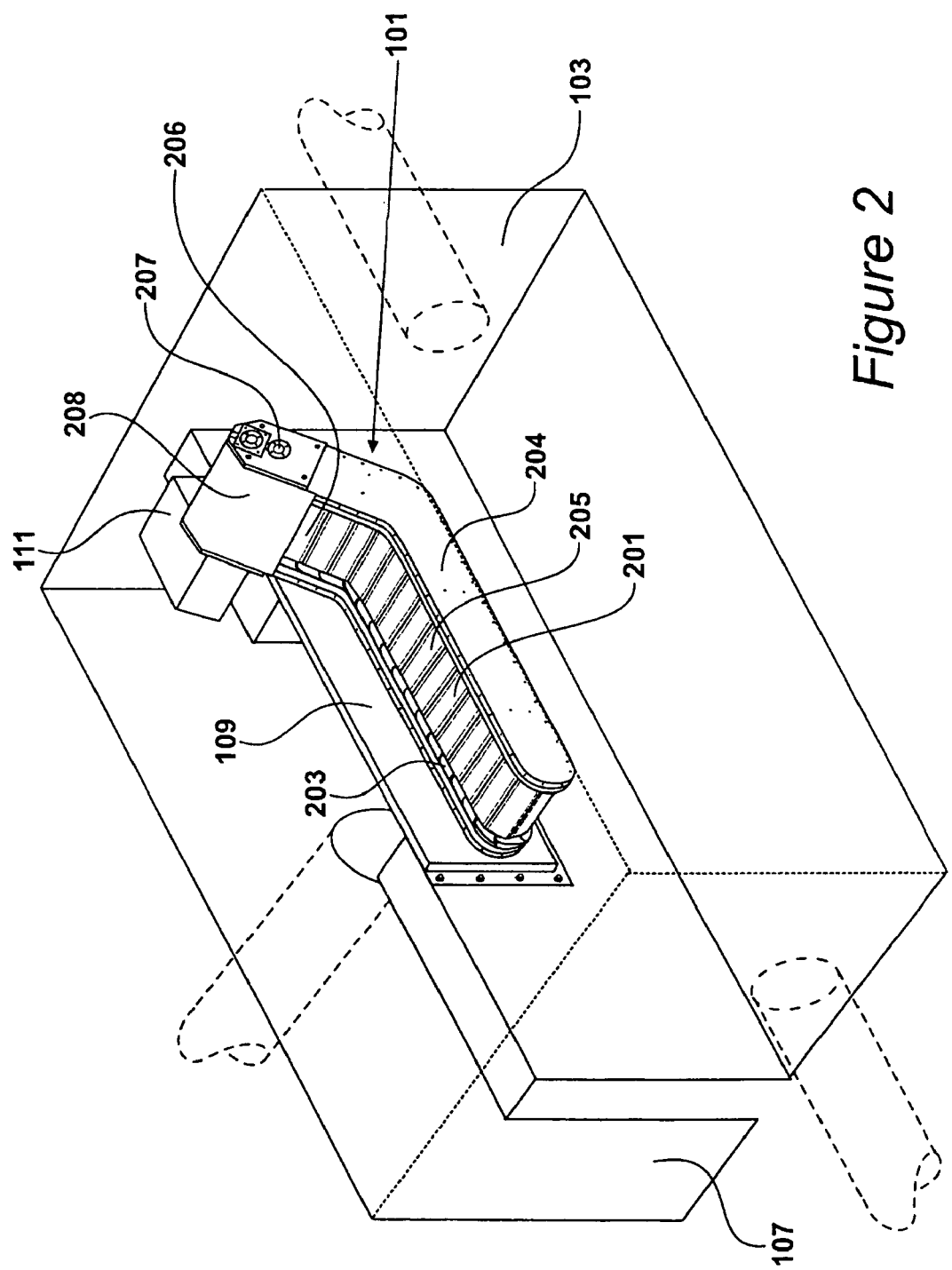
FIG. 2 shows the screening apparatus 101 of FIG. 1 without the sewage 102 in chamber 103.

The screening apparatus 101 of FIG. 1 is shown in FIG. 2, without the sewage 102 in chamber 103. The screening apparatus 101 has a continuous screen band 201 comprising a plurality (typically 30 to 40) of screening panels hingedly connected together.

One edge 203 of the screen band 201 is mounted within a first guide, which also provides a seal preventing the passage of sewage around the edge of the band. The opposite edge is located within a similar second guide having similar sealing means. The first guide is mounted on the blanking plate 109, while the second guide is mounted on a side plate 204, itself being rigidly supported by the blanking plate 109.

The screen band 201 forms a continuous loop having a horizontal branch 205 extending along the weir and a second branch 206 rising at an angle of 45 degrees to the horizontal.

The continuous screen band 201 is driven around its guides by means of a pair of sprockets located at its upper end. Thus the side panel 204 supports a bearing housing 207 which contains the bearings of the sprocket axle. The sprockets, and hence the screen band, are driven by an electric motor located within the housing 111.

A brush is located inside a cover plate 208 at the upper end of the screen band. The brush has a cylindrical profile and is driven in a rotating manner by a second electric motor located within housing 111. In operation, the brush removes solid material from the upper end of the screen band.

FIG. 3

Figure 3:
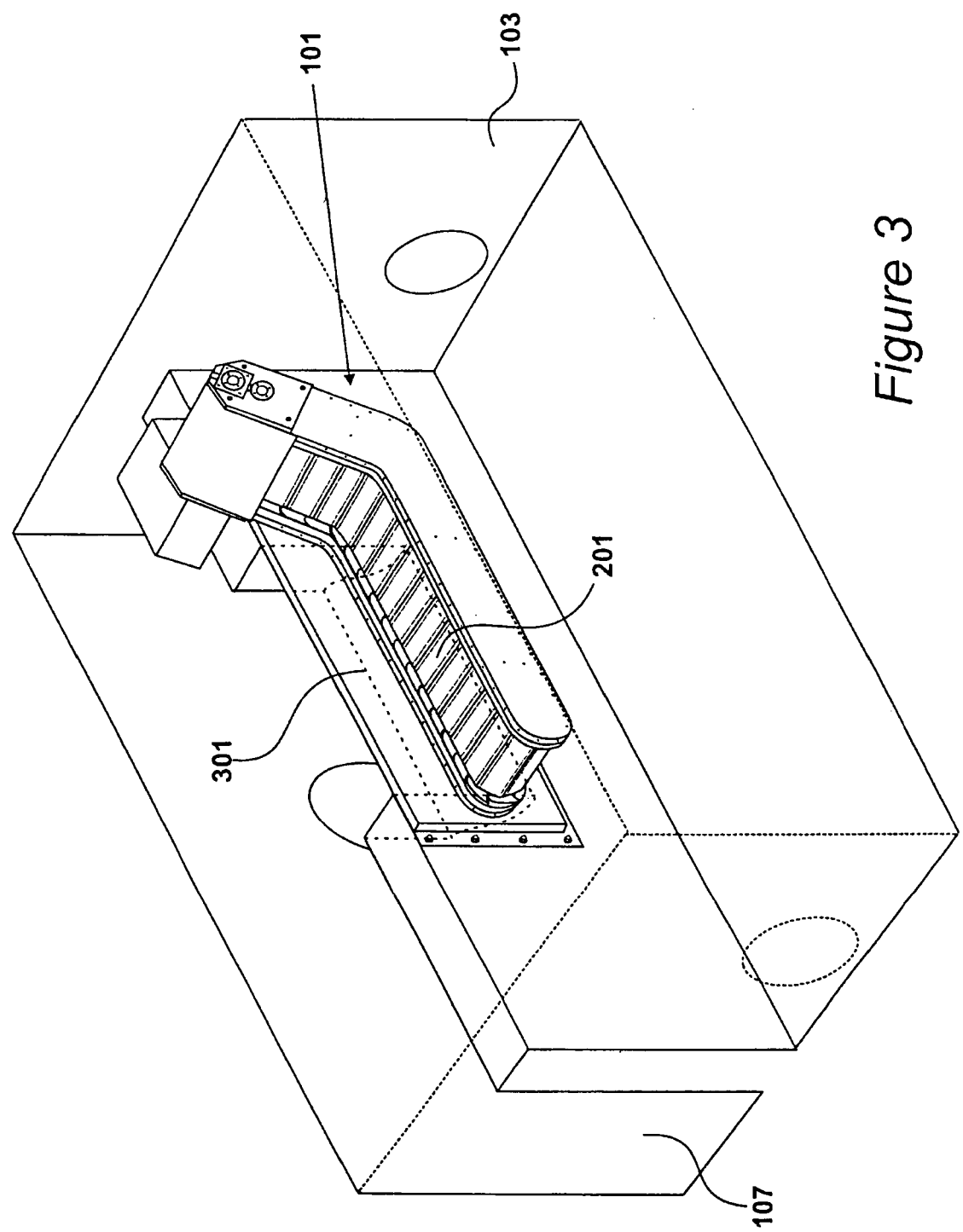
FIG. 3 shows the screening apparatus 101 with the weir 301 indicated by dashed lines.

The screening apparatus 101 is shown in FIG. 3 with the weir 301 indicated by dashed lines.

The overflow weir 301 has a shaped profile to facilitate the passage of water from the screening apparatus 101 into the overflow chamber 107.

Generally, during periods of low flow levels, the sewage level in the chamber 103 is below the apparatus 101. No screening is required and the apparatus is powered down. However, during high flow levels, i.e. when the sewage level in the chamber 103 is above the weir 301, water passes through the screen panels of the band 201 and over the weir 301. A sewage level sensor, (not shown) for example an ultrasonic level probe, is located above the chamber 103. When the sewage level reaches the height of the top of the weir, signals from the level sensor are used to activate the motors driving the screen band and the rotary brush. Consequently, the panels of the screen band 101 are moved past the brush which sweeps solid matter adhered to the screen band back into the sewage stream in chamber 103.

In an alternative embodiment, the signals from the sewage level sensor are used to activate the motors driving the screen and brush when the sewage level rises above the lowest screen panels of the screen band 201. Thus the screen band is cleaned during the period when the sewage level rises to the weir height.

FIG. 4

Figure 4:
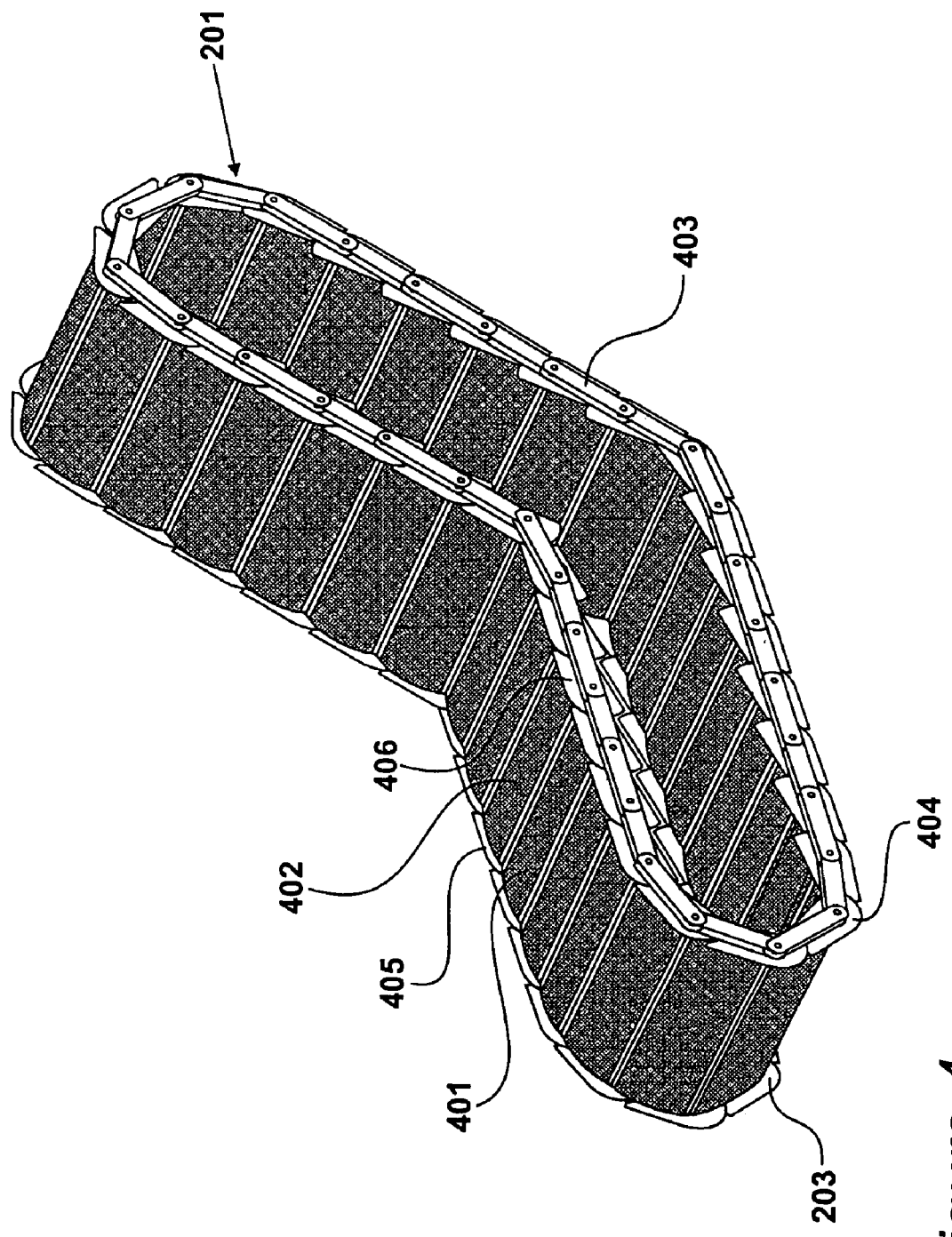
FIG. 4 shows the screen band 201 removed from the apparatus 101.

The screen band 201 is shown removed from the apparatus 101 in FIG. 4. The screen band comprises 32 screen panels, such a panels 401 and 402. Each screen panel is rigidly attached to a respective link in a continuous loop chain 403 which runs along one edge 404 of the screen band 201, and to a respective link in a second similar chain on the opposing edge 203. When assembled in the apparatus 101, the chain 403 runs along the guide on the side panel 204 while the other chain runs along the guide on blanking panel 109.

The screen panels each have a curved screening section extending between a pair of flat end plates, such as end plates 405 and 406 of screen panel 402, which extend perpendicularly to the curved screening section. The outer surfaces of the end plates provide a sealing surface in the assembled apparatus.

Figure 5B:
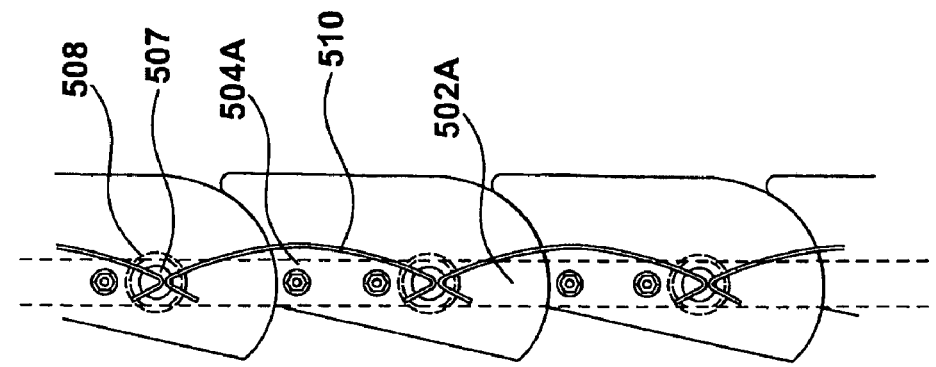
FIG. 5B shows a top view of screen panels 401 and 402.
Figure 5A:
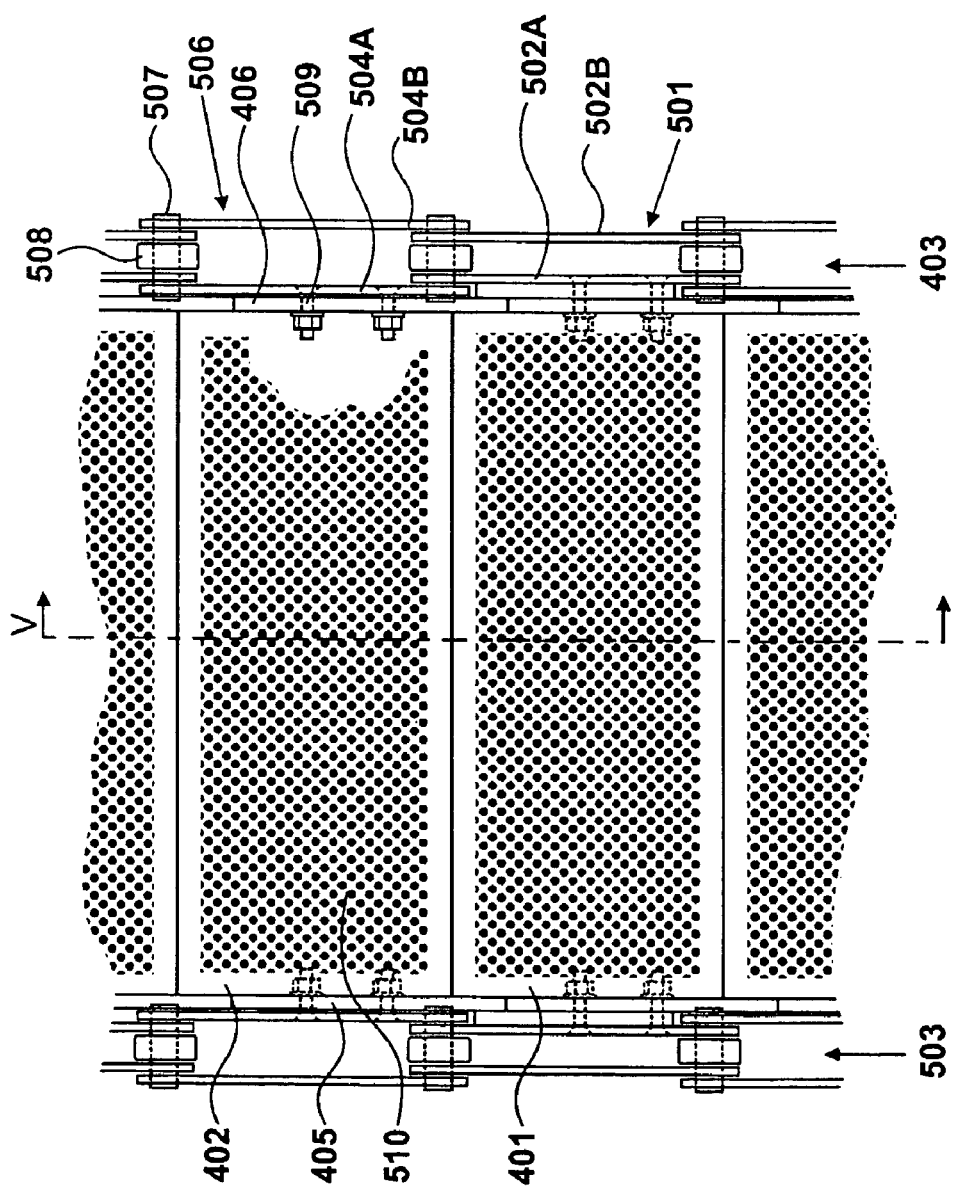
FIG. 5A shows a cross sectional view of screen panels 401 and 402.

FIGS. 5A and 5B

A top view of screen panels 401 and 402 is shown in FIG. 5B, while a cross sectional view of said panels, along line VV, is shown in FIG. 5A.

Each of the chains 403 and 503 are similar to bicycle chains. Therefore, each link comprises a pair of parallel plates pivotally connected to adjacent links, and the links alternate between narrowly spaced plates, such as plates 502A and 502B of link 501, and widely spaced plates, such as plates 504A and 504B of link 506. A pivot pin, such as pin 507 pivotally connects adjacent links, and a rotatable spacer, such as spacer 508, located on the pivot pin separates the narrowly spaced plates. The spacer 508 is a cylindrically shaped piece of metal which is configured to be acted upon by a respective one of two drive sprockets (illustrated in FIG. 6).

The inner plate of each link is attached to the respective end plate by a pair of bolts. Thus, for example, the inner plate 504A of chain link 506 is attached to end plate 406 by two bolts 509.

The shape of the end plates is most clearly shown in FIG. 5A. Each plate is similarly shaped, having a convex circular front edge and a concave circular rear edge of the same radius. Thus, adjacent screen panels are able to pivot about each other while the respective end plates remain in abutting relationship.

The curved screening section of each panel, such as section 510 of panel 402, defines an array of 6 mm (six millimeter) diameter circular apertures. It is these aperture arrays which allow the passage of water from the chamber 103, over the overflow weir, into overflow chamber 107, while preventing larger particles of solid material suspended in the sewage 102 from entering chamber 107.

In the present embodiment, the screen band 201 is manufactured from stainless steel components. However, in an alternative embodiment, the curved sections defining the screening apertures are made from a plastics material.

FIG. 6

Figure 6:
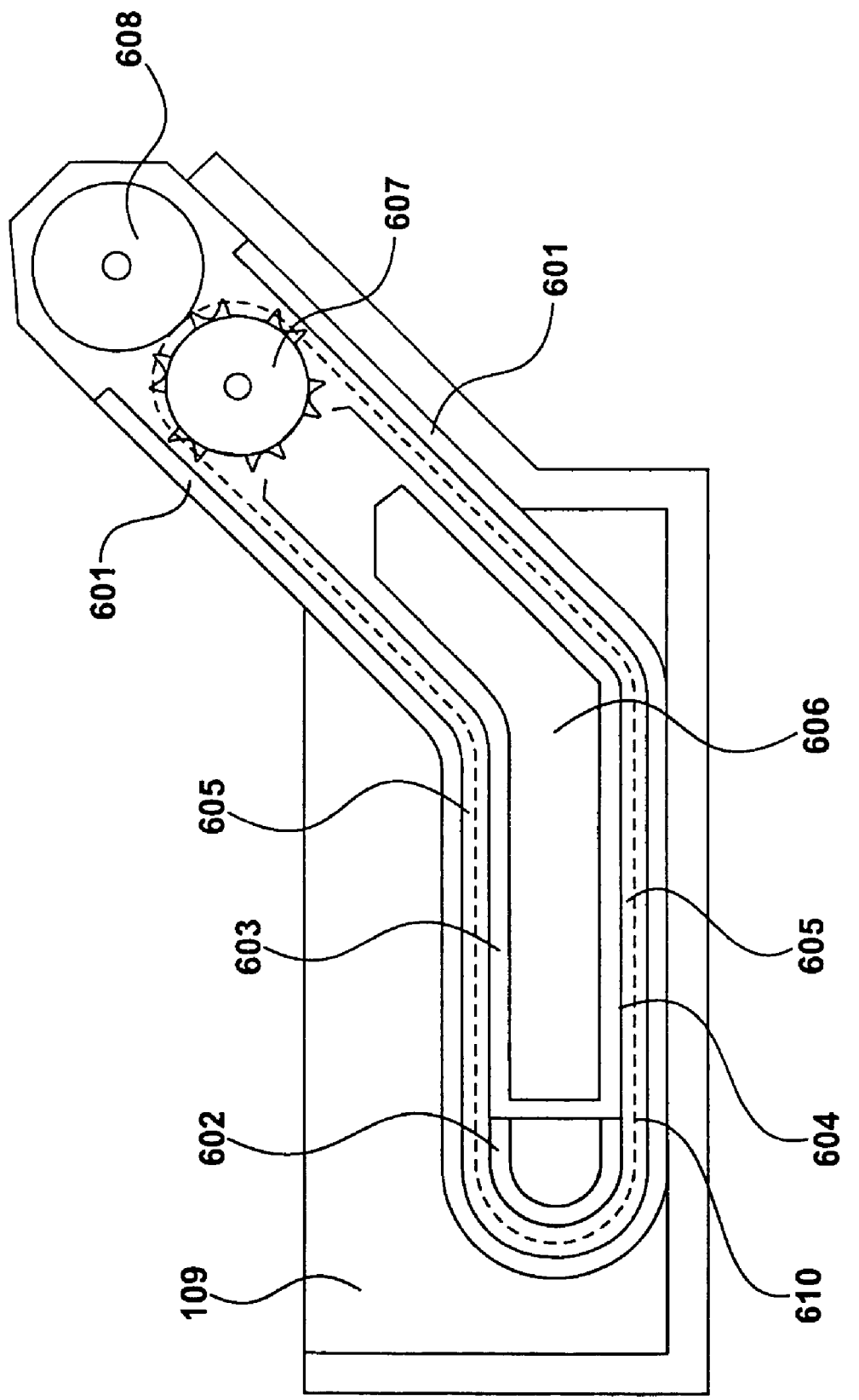
FIG. 6 shows the blanking plate 109 and associated chain guide.

The blanking plate 109 and associated guide is shown in FIG. 6. The guide comprises several parts, namely: an outer guide element 601; an inner bend guide 602, and upper and lower inner guide rails 603 and 604 respectively. The guide rails 603 and 604 are fabricated from stainless steel, while the outer guide element and inner bend guide are machined from polyethylene.

The outer guide element 601 is separated from the inner bend guide 602 and the inner guide rails 603 and 604 by a gap 605 configured to receive the chain 503. (The location of chain 503 is indicated by dashed line 610.) When the apparatus 101 is assembled, with the chain 503 in the gap 605, the outer surfaces of the end plates, such as end plate 405, are in close proximity to the outer guide element 601, and, therefore, said end plates in co-operation with said outer guide element provide a sealing means.

An elongated aperture 606 is cut in the blanking plate 109 inside the path of the screen band defined by the gap 605. In use, the aperture 606 extends along a large proportion of the weir, and provides a water outlet from the apparatus 101 to the weir 301.

One of the two chain drive sprockets 607, and the screen band cleaning brush 608 are also illustrated in FIG. 6. The screen band is driven by the sprockets 607 located at its highest end, and the cleaning brush cleans a portion of the band currently passing around said sprockets.

FIG. 7

Figure 7:
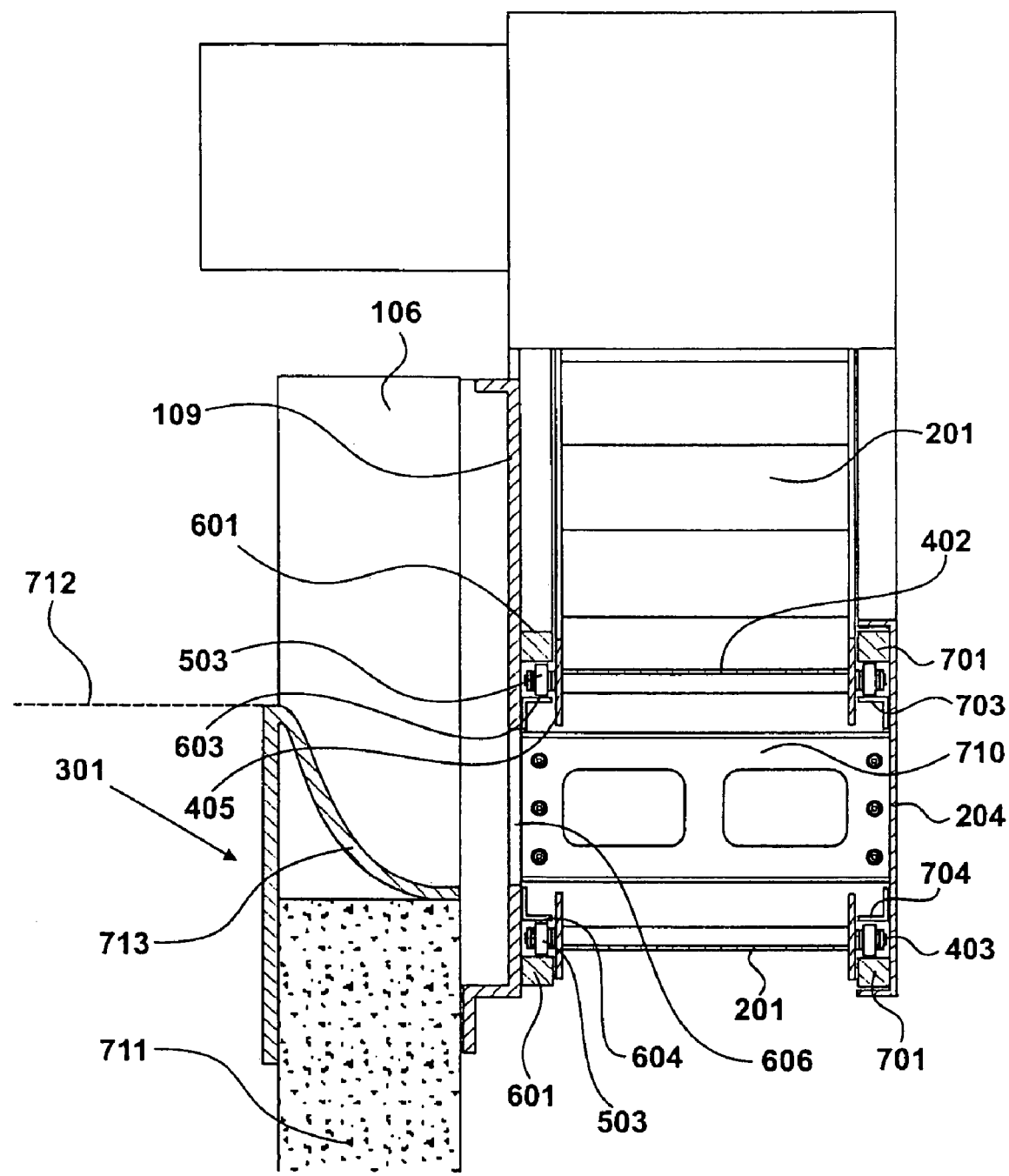
FIG. 7 shows a cross-sectional view of the screening apparatus 101, and the weir 301, through screening panel 402.

A cross-sectional view of the screening apparatus 101, and the weir 301, through screening panel 402 is shown in FIG. 7. As described above, the chain 503, which supports screening panels of screen band 201, is located between an outer guide element 601 and inner guide rails 603 and 604. The close proximity of end plates, such as end plate 405, and the outer guide element 601 provide a seal between the screen band 201 and the blanking plate 109.

Similar outer guide element 701, and inner guide rails 703 and 704, mounted to side plate 204, provide a guide for the chain 403.

A number of centre braces 710 rigidly connects the side plate 204 to the blanking plate 109.

In this embodiment, the weir is constructed by forming a portion 711 of wall 106 with reduced height, below the level of the normal weir setting. The height of the weir 301 is then brought up to the level of the weir setting 712 by a profiled member 713. The profiled member 713 is formed from stainless steel and is rigidly attached to the top of the wall portion 711. The profiled member 713 has a surface which curves upwards away from the screening apparatus 101, such that the weir 301 is provided with an upper edge of reduced width. Consequently, a void is provided adjacent to the aperture 606 in blanking plate 109 which facilitates the flow of water from the apparatus and out over the weir.

FIG. 8

Figure 8:
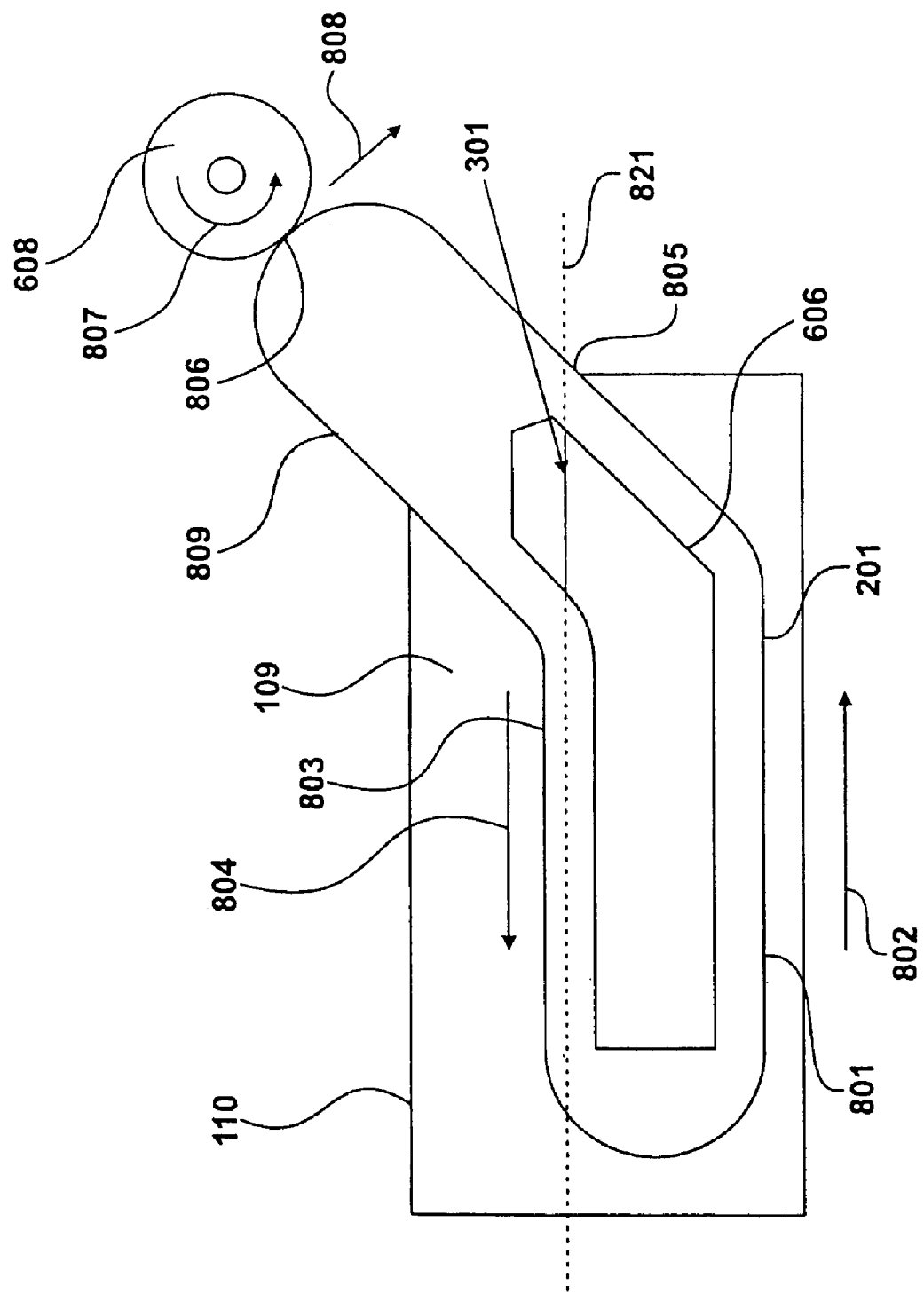
FIG. 8 shows a schematic representation of the screen band 201, the blanking plate 109 and the cleaning brush 608.

A schematic representation of the screen band 201, the blanking plate 109 and the cleaning brush 608 is shown in FIG. 8. During operation, the screen band 201 moves continuously around the circuit formed by the guides and the sprockets 607 of apparatus 101. However, at any moment in time, the screen band has a first horizontal portion 801 which moves along the weir 301 towards one end of said weir in direction of arrow 802. Thus, the lower horizontal portion 801 moves in the general direction of sewage flow through chamber 103. The screen also has a second horizontal portion 803 which moves along the weir 301 towards the opposite end of said weir in direction of arrow 804. A third portion 805 of the screen band 201 extends upwards from the lower horizontal portion 801 to an elevated position 806 where the cleaning brush 608 acts upon said screen band to remove unwanted attached solid matter. The brush is driven in direction of arrow 807 such that the solid matter tends to get brushed off, back into the sewage, as indicated by arrow 808.

In the present embodiment a fourth portion 809 of the screen band 201 extends upwards from the second portion 803 to the elevated position, substantially parallel to the third portion.

In alternative embodiments the third and fourth portions may not be parallel, and in one particular embodiment, the third portion rises substantially vertically.

To provide a robust band and guide system, while keeping the dimensions of the apparatus within tolerable limits, the third portion 805 extends at an angle of between 30 and 60 degrees to the horizontal, and an angle of 40 to 50 degrees is preferred.

In use, when the sewage level in chamber 103 reaches the weir height, indicated by dashed line 821, the screening apparatus 101 starts to perform its screening function, and the driving motors housed within housing 111 are activated. When the flow level gets above the level of the upper horizontal portion 803, said portion also filters debris from the sewage and allows water to flow through to aperture 606 and weir 301.

It may be noted that additional screening, to that provided by the first and second horizontal portions 801 and 803, is provided by submerged parts of the angled third and fourth portions 805 and 809.

When the sewage level rises to a height above the emergency overflow 110, a proportion of the flow to the weir will be over the emergency overflow but a major proportion of flow will continue to be through the screen band 201 and aperture 606. Thus in extreme conditions, when the screening apparatus is unable to keep the sewage level below the emergency overflow level, it can still operate at its full capacity. This is because the elevated position 806 where the brush acts is still above the sewage level.

As a consequence of this, when the level of sewage drops below the emergency overflow level, the apparatus 101 continues to operate normally to further reduce the level.

FIG. 9

Figure 9:
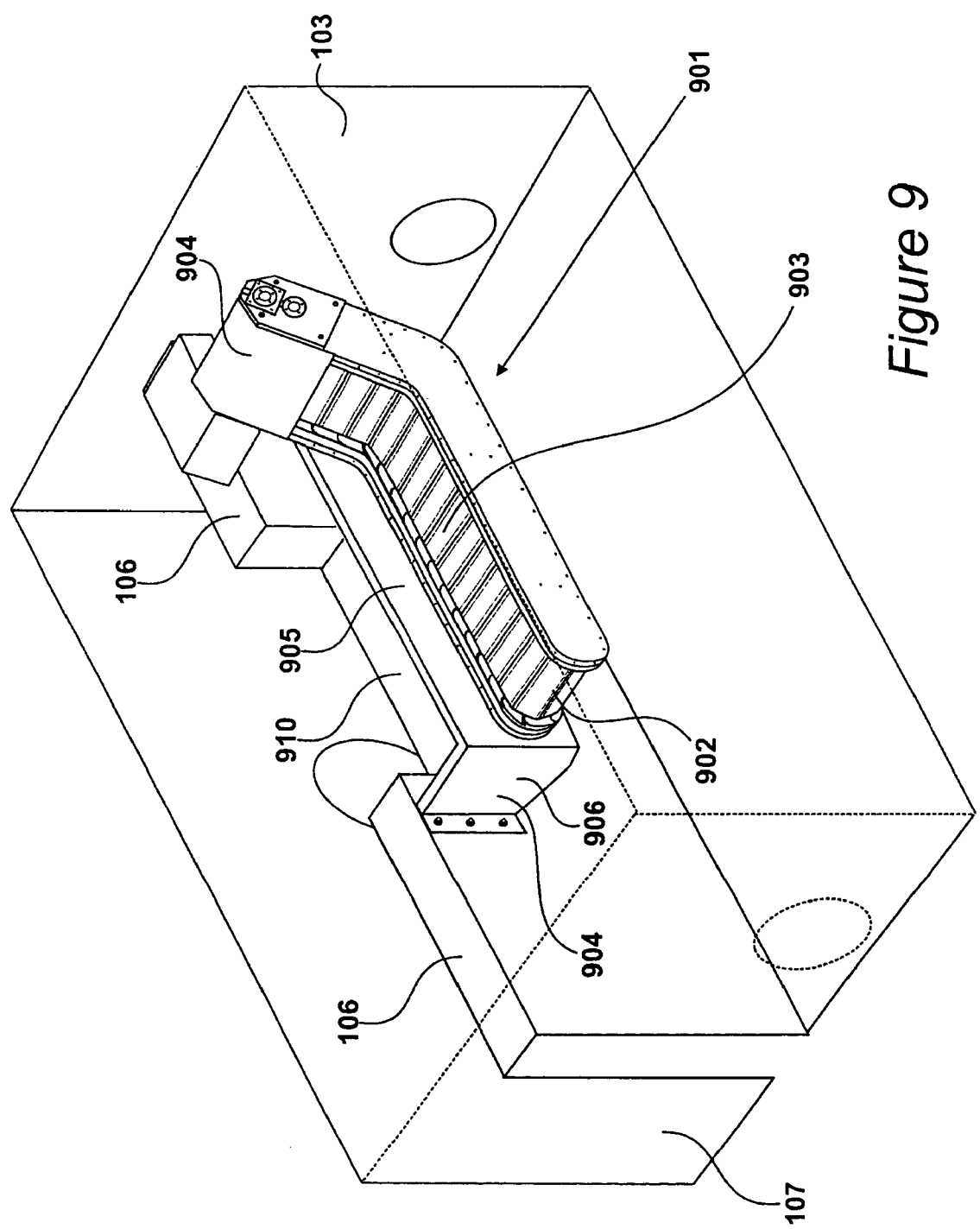
FIG. 9 shows an alternative screening apparatus 901 embodying the present invention.

An alternative screening apparatus 901 embodying the present invention is shown in FIG. 9. The apparatus 901 is substantially the same as screening apparatus 101 of FIG. 1 in that: it has a continuous moving screen band 902 comprising a plurality of connected screening panels; the screen band 902 has an upper horizontal portion 903 which moves along the weir from right to left, and a lower horizontal portion moving along the weir from left to right; and a third portion extends upwards from the lower horizontal portion to an elevated position where a brush cleaning mechanism, located under cover plate 904, removes solid debris from the screen band 902.

The arrangement of FIG. 9 differs from that of FIG. 1 in that the blanking plate has been replaced by a box structure 904. The screening apparatus 901 is located on a front panel 905 of the box structure 904, with the front panel being attached to the wall 106 by two side panels 906 and a bottom panel (shown in FIG. 10). The front, side and bottom panels of the box structure 904 are leak-proof and are sealed to the wall 106 such that sewage cannot escape from chamber 103 to overflow chamber 107 without passing through the screening apparatus 901. The box structure 904 provides a space between the screening apparatus 901 and the weir 910, to allow water to escape from said apparatus and pass upwards over the weir 910. Consequently, weir 910 has a conventional structure, being completely formed in concrete.

FIG. 10

Figure 10:
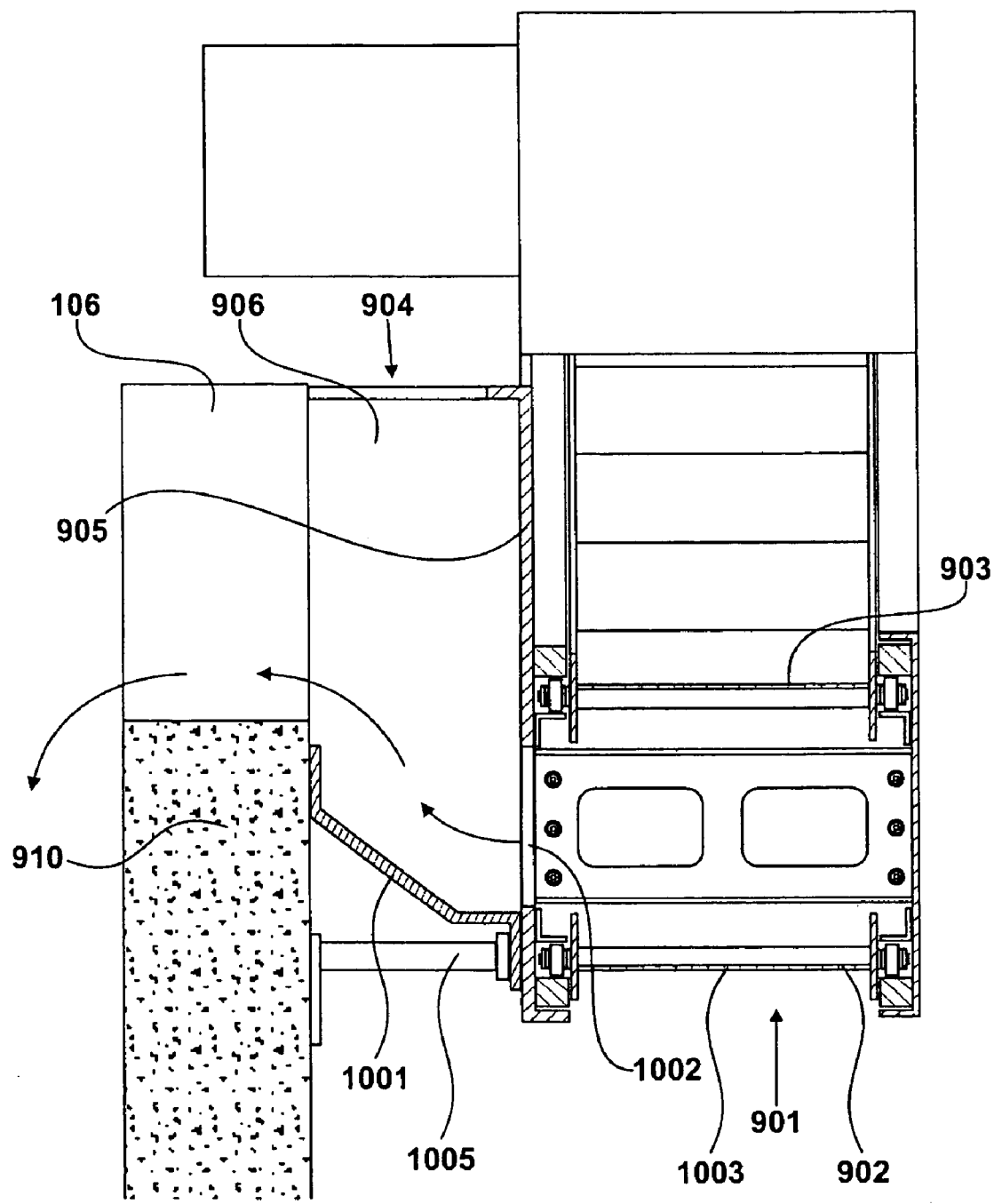
FIG. 10 shows a cross-sectional view of the screening apparatus 901, which illustrates the function of the box structure 904.

The function of the box structure 904 is illustrated by the cross-sectional view of the screening apparatus 901 in FIG. 10. The bottom panel 1001 and side panels 906 of box structure 904 support the front panel 905 such that it is parallel to and spaced from the wall 106. Consequently, a void is produced between the lower portion of the side panel 905 and the weir 910, so that water leaving the screening apparatus 902 via aperture 1002 passes through the void produced by the box structure 906 and over the weir 910.

It should be noted that the relative height of the weir 910 and the upper horizontal portion 903 of the screen band 902 is similar to that of the first embodiment illustrated in FIG. 7. Thus, like the screening apparatus 101, screening apparatus 901 screens solid matter from the sewage using the upper horizontal portion 903 as well as the lower horizontal portion 1003.

A number of cantilever support posts 1005 arranged between a lower part of the screening apparatus 901 and the wall 106 provide additional support for said apparatus.

The invention claimed is:

1. Screening apparatus attached to an overflow weir in a sewerage system, comprising:
    a continuous moving screen band such that a first portion of said screen band is configured to move along said weir towards one end of said weir, a second portion of said screen band is configured to move along said weir towards the opposite end of said weir;
    a band cleaning mechanism, and
    a panel attached to the weir wall supporting a guide for one edge of the screen band,
    wherein:
    said screen band further comprises a steeper portion extending to an elevated position above said first and second portions;
    said band cleaning mechanism is arranged to remove solid matter from the screen band at said elevated position; and
    said panel defines an emergency overflow level, said first and second portions being arranged to be below said emergency overflow level, whereby both of said first and second portions are arranged to provide a flow of water into said apparatus and to said overflow weir.

2. Screening apparatus according to claim 1, wherein said panel also defines an aperture, such that water passing through the band screen passes through the aperture and to the weir.

3. Screening apparatus according to claim 1, wherein said elevated portion is arranged to be above said emergency overflow level.

* * * * *